(12) United States Patent
Anderson

(10) Patent No.: US 7,406,227 B2
(45) Date of Patent: Jul. 29, 2008

(54) EFFICIENT COUPLING OF LIGHT INTO A LIGHT GUIDES

(75) Inventor: Duncan J. Anderson, Sleepy Hollow, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 167 days.

(21) Appl. No.: 10/545,714

(22) PCT Filed: Dec. 5, 2003

(86) PCT No.: PCT/IB03/05738

§ 371 (c)(1), (2), (4) Date: Aug. 12, 2005

(87) PCT Pub. No.: WO2004/055564

PCT Pub. Date: Jul. 1, 2004

(65) Prior Publication Data

US 2006/0159397 A1   Jul. 20, 2006

Related U.S. Application Data

(60) Provisional application No. 60/433,376, filed on Dec. 13, 2002.

(51) Int. Cl.
*G02B 6/26* (2006.01)
(52) U.S. Cl. .......................... 385/39; 385/52
(58) Field of Classification Search .................. 385/30, 385/31, 39, 48–50, 52, 146, 29, 147
See application file for complete search history.

(56) References Cited

U.S. PATENT DOCUMENTS

| 4,679,908 | A | | 7/1987 | Goodwing |
| 5,039,191 | A | * | 8/1991 | Myszka ........................ 385/31 |
| 5,319,195 | A | | 6/1994 | Jones et al. |
| 6,139,157 | A | * | 10/2000 | Okuyuma .................... 353/102 |
| 6,400,876 | B1 | | 6/2002 | Biscardi et al. |
| 6,493,485 | B1 | * | 12/2002 | Korevaar ...................... 385/33 |
| 6,690,459 | B2 | * | 2/2004 | Bruns .......................... 356/153 |

FOREIGN PATENT DOCUMENTS

DE   3152020 A1   7/1983

OTHER PUBLICATIONS

Shiro et al., "Aligning Method for Optical Component", Patent Abstracts of Japan, Publication No. 01283507A, Publication Date Nov. 15, 1989.

* cited by examiner

*Primary Examiner*—Sarah Song

(57) ABSTRACT

Method and apparatus of coupling light into a light guide using error detecting and correcting systems. A rectangular light guide is mated with an X-axis optical fiber and with a Y-axis optical fiber. An X-axis photodetector senses light that couples from the light guide into the X-axis optical fiber, while a Y-axis photodetector senses light that couples from the light guide into the Y-axis optical fiber. An error detector compares the outputs of the X-axis and the Y-axis photodetectors to produces error signals that depend on the X-axis, the Y-axis, and the Z-axis positional errors. The errors signals are applied to an error correcting system that adjusts the relative position of the light guide and the light directed onto the light guide.

23 Claims, 2 Drawing Sheets

EFFICIENT COUPLING OF LIGHT INTO A LIGHT GUIDES

CROSS REFERENCE TO RELATED APPLICATION

This application claims the benefit of U.S. provisional application Ser. No. 60/433,376 filed Dec. 13, 2002, which is incorporated herein by reference.

This invention relates to light guides that transport light. More specifically, this invention relates to image projection systems having light sources that produce light that is efficiently coupled into light guides.

Some color image projection systems use a white light source whose beam is separated into primary components (usually red, blue and green), which are then individually modulated according to corresponding color information derived from incoming display signals. Subsequently, the modulated color components are recombined to produce a full color image that is projected onto a viewing screen.

The modulation of the primary components is commonly performed using a separate electro-optical light modulator, typically a liquid crystal display (LCD) panel, for each primary component. Another type of color image projection system is similar, but uses only one LCD panel to modulate the primary components. This is performed by shaping the primary components into band-shaped cross-sections that are sequentially scrolled across an LCD panel that is modulated in accord with the color component being scrolled. Other types of light modulators, such as those based on micromechanical mirrors (MEMS), are also known.

The image projection systems described above require a light source, various optical elements such as prisms, polarizers, and lenses, an electronic subsystem, and a modulator or modulators. While such image projection systems are generally successful, they tend to be relatively large. This is a problem because market demands are greater for lighter, more compact systems. Thus, it is desirable to reduce the size and weight of image projection systems. It should be noted that smaller image projection systems tend to use smaller optical elements, which can be significantly cheaper than larger optical elements.

While reducing the size of an image projection system is beneficial in many respects, smaller image projection systems are susceptible to various problems. For example, reduced size image projection systems benefit from using light guides to internally transport light to the various optical components. While this itself is not a problem, efficiently coupling light into a light guide, particularly one having a small cross-section, can be difficult to do. This is especially true over time, temperature, and physical impacts to the image projection system. Indeed, movement of a light source's emissive volume, such as a change in position of an arc relative to a light source's input electrodes, can significantly impact the efficiency of optical coupling between the light source and a light guide.

Similar problems of optically coupling a light source to a light guide are discussed in U.S. Pat. No. 5,319,195, which issued on Jun. 7, 1994 to Jones et al. That patent teaches coupling a laser beam into an optical fiber. FIGS. 1 and 2 of Jones, and the supporting text, teach transducers that measuring the power of light propagating in an optical fiber that transports a laser beam. Furthermore, FIGS. 3 and 5, and the support text, teach using those transducers to determine misalignment between the laser and the optical fiber, and suggest using the determined misalignment to align the input end of the optical fiber with the laser.

While beneficial, the teachings of Jones are inherently limited. For example, misalignment between the optical fiber and the laser is sensed using only one input end transducer. Thus, directional information regarding misalignment is either nonexistent or very limited. Thus, Jones does not suggest determining and correcting multi-directional alignment errors or focal errors.

One difficulty in ensuring efficient optical coupling between a light source and a light guide is determining when the coupling is not efficient. Thus, an error detecting system that senses when light from a light source is not efficiently coupled into a light guide would be useful. Beneficially, that error detecting system would provide sufficient information to determine both the degree and the direction or directions of the coupling errors. Then, the information from the error detecting system could be used to adjust the relative position between the light guide and the light directed into the light guide so as to achieve efficient coupling. Such as error correcting system would be particularly useful in an image projection system to automatically ensure efficient coupling of light from a light source, typically an arc lamp, into a light guide. Such an image projection system would be easier to initially align as well since only a coarse initial set-up would be required since the system could be self-aligning.

Therefore, in view of the foregoing, it is desirable to provide for an error detecting system that senses when light from a light source is not efficiently coupled into a light guide. Accordingly, an error detecting system is disclosed herewith that uses a rectangular (including square) light guide. A first (X-axis) optical fiber core is mated to one side of the light guide while a second (Y-axis) optical fiber is mated to another (perpendicular) side. A first (X-axis) photodetector senses light that couples from the light guide into the first (X-axis) optical fiber while a second (Y-axis) photodetector senses light that couples from the light guide into the second (Y-axis) optical fiber. It should be noted that, within limits, the light that couples into the optical fibers increases as the coupling efficiency between the light source and the light guide decreases.

An electronic error detector then compares the outputs of the first and second photodetectors to determine whether the light beam from the light source is efficiently coupled into the light guide. Beneficially, the electronic error detector produces X-axis, Y-axis, and Z-axis positional errors. Also beneficially, the error detecting system provides sufficient information to determine both the degree and the direction or directions of the coupling error.

The output of the error detecting system can then be used by an error correcting system to adjust the relative position of the light guide and the light that is directed into the light guide so as to achieve efficient coupling. The error correcting system can adjust the relative position by incorporating a number of different types of relative motion inducing devices, specifically including motors, piezoelectric benders, opto-electronic modulators, opto-electronic light valves, diffraction grating, and electromechanical devices such as solenoids and voice-coil schemes.

The error detecting system and the error correcting system described above can also be used in image projection systems to automatically ensure efficient coupling of light from a light source, typically an arc lamp, into a light guide. Such an image projection system would be easier to initially align as well since fine alignment can be performed automatically.

It is to be understood that both the foregoing general description and the following detailed description are exemplary and explanatory only. Other embodiments, variations of embodiments, and equivalents, as well as other aspects, objects, and advantages of the invention, will be apparent to those skilled in the art and can be obtained from a study of the drawings, the disclosure, and the appended claims, or may be learned by practicing the invention.

Reference will now be made in detail to embodiments of the present invention, examples of which are illustrated in the accompanying figures.

Figure 1:
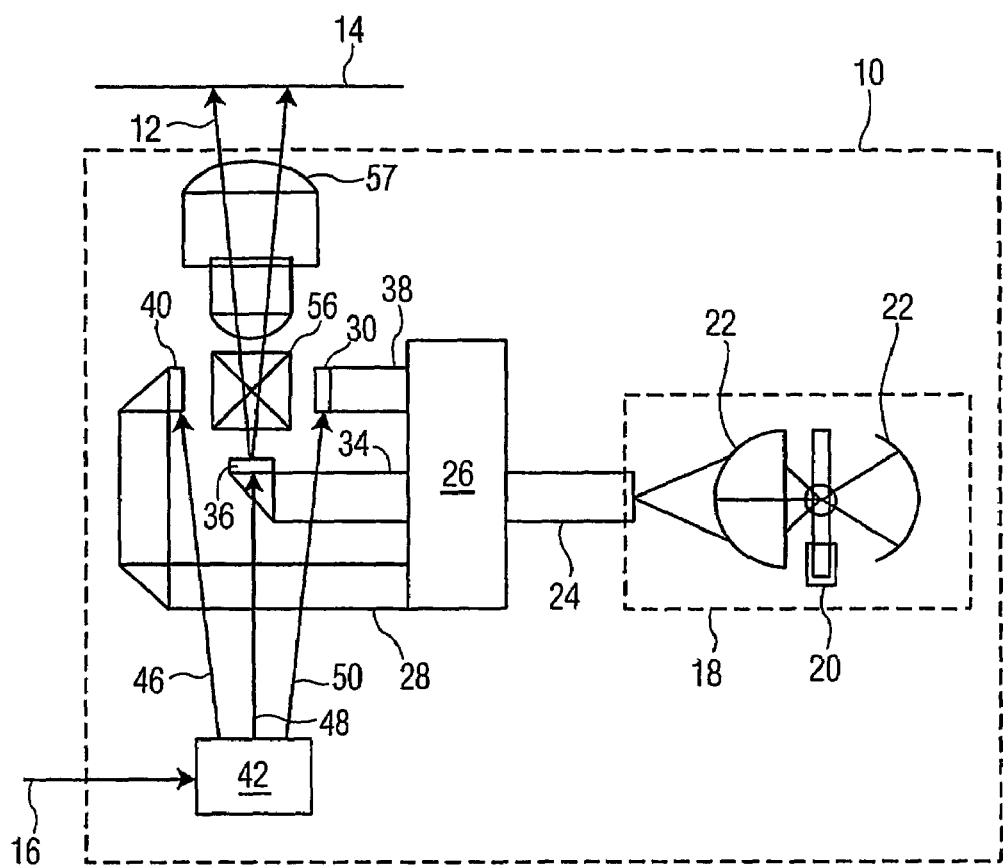
FIG. 1 illustrates a generic color image projector system that is in accord with the principles of the present invention.

FIG. 1 illustrates an image projector system 10 that is in accord with the principles of the present invention. It should be understood that the image projector 10 represents a generic image projector that is suitable for explaining the principles of the present invention and for illustrating how those principles can benefit image projection systems in general.

The purpose of the image projector system 10 is to project a modulated light beam 12 onto a surface 14 so as to create desired images. Those images are produced in accord with input signals, such as television signals, computer generated signals, or other types of digitized or analog signals, that are input on a port 16.

The image projector system 10 includes an illumination unit 18 that includes a light source 20 and a reflector/lens system 22. In practice, arc lamps are often used as light sources. The reflector/lens system 22 inputs light into a rectangular (including square) light guide 24. The light in the light guide 24 is transported to a color separator 26 that separates the white light from the light source 20 into its red, green, and blue components (or other primary components). The red component is applied via a light guide 28 to a red modulator 40. The green component is applied via a light guide 34 to a green modulator 36, and the blue component is applied via a light guide 38 to a blue modulator 30.

Still referring to FIG. 1, the signals input on port 16 are applied to an electronic subsystem 42. That subsystem extracts red, green, and blue information from the input signals to produce red, green, and blue modulation signals. The red modulation signals are applied to the red modulator 40 via a red signal line 46, the green modulation signals are applied to the green modulator 36 via a green signal line 48, and the blue modulation signals are applied to the blue modulator 30 via a blue signal line 50. The red, green, and blue modulators (40, 36, and 30) modulate the color components in accord with the modulation signals.

The modulated color components are then applied to an optical processor 56 that combines the red, green, and blue modulated color components to produce the light beam 12. The light beam 12 passes through a set of projection optics 57 to produce the desired images on the surface 14.

The image projector system 10 uses numerous light guides (the light guides 24, 28, 34, and 38,) to internally transport light. While the use of light guides is beneficial, in practice it is important to ensure that light is efficiently coupled into the various light guides. To do so, the image projector system 10 includes at least one error detecting circuit and at least one error correction system.

Figure 2:
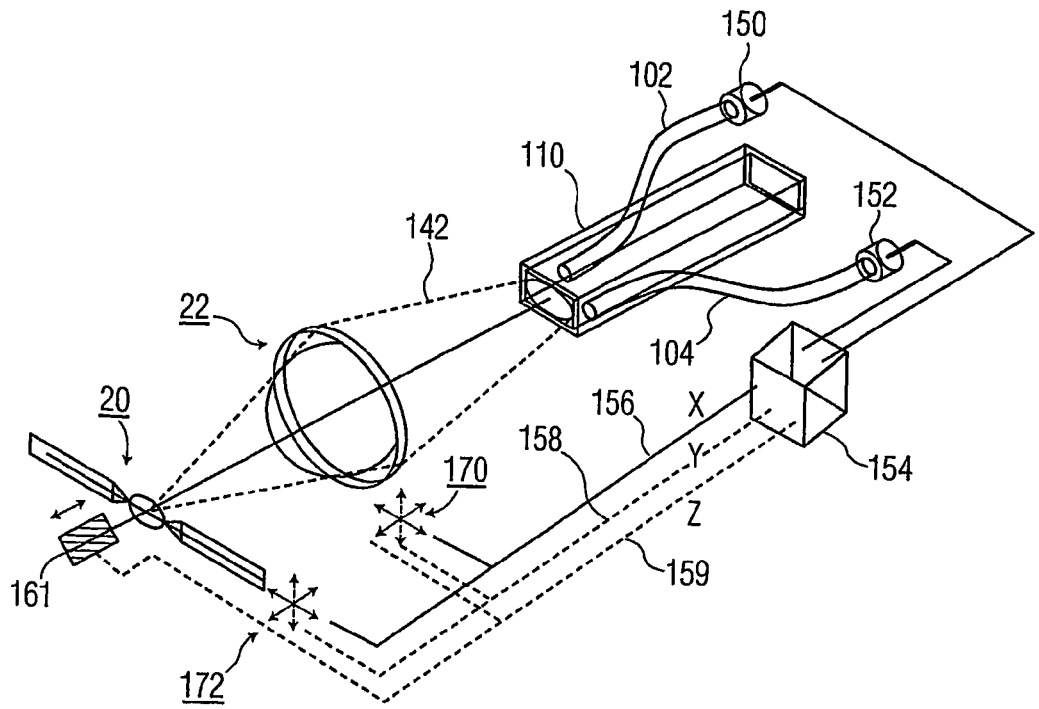
FIG. 2 illustrates an error detecting system suitable for use in the image projector system of FIG. 1.
Figure 3:
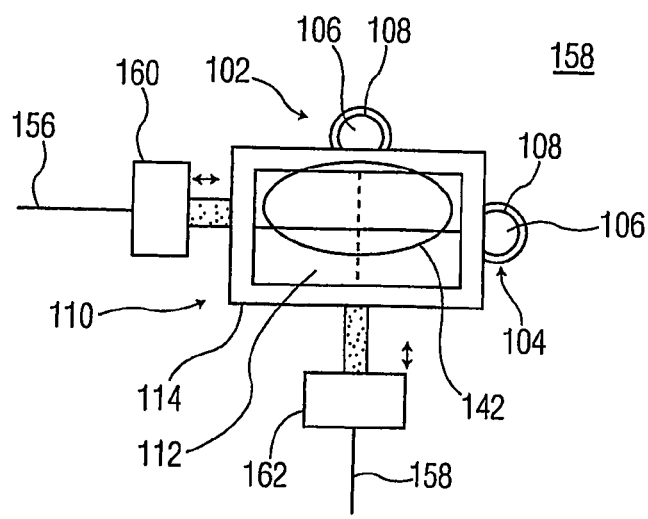
FIG. 3 illustrates an error correcting system suitable for use in the image projector system of FIG. 1.

Referring now to FIGS. 2 and 3, the error detecting circuit includes a Y-axis optical fiber 102 and an X-axis optical fiber 104. Each optical fiber has a core 106 that is surrounded by a cladding layer 108 (see FIG. 3). Normally, the cladding layer 108 is surrounded by a buffer layer and by a jacket that protect the core 106 and the cladding layer 108 and that provide mechanical strength. The Y-axis and X-axis optical fibers 102 and 104 mate to a rectangular light guide, referenced in FIGS. 2 and 3 as light guide 110. It should be understood that the light guide 110 generically represents one or more of the light guides shown in FIG. 1.

As shown in FIG. 3, the light guide 110 includes a core 112 that is surrounded by an outer cladding layer 114. The outer cladding layers 108 of the Y-axis and X-axis optical fibers 102 and 104 are partially removed to enable their cores 106 to contact the outer cladding layer 114. Beneficially, the outer cladding layer 114 and the cores 106 have similar refractive indexes. This enables light in the outer cladding layer 114 to couple into the cores 106.

Referring now to both FIGS. 2 and 3, light 142 from a light source, assumed for explanatory convenience to be the light source 20, is to be efficiently coupled into the light guide 110. As shown, the light 142 passes through the lens portion of the reflector/lens 22 to produce a light spot on the light guide 110. Ideally, that light spot illuminates only the core 112. However, as shown in FIG. 3, this is not always the case. When the light 142 overlaps the cladding layer 114 some of the light 142 passes into the cladding layer 114 and couples into the core 106 of an optical fiber. FIG. 3 shows the light 142 illuminating the cladding 114 under the Y-axis optical fiber 102. Thus, some of the light 142 couples into the Y-axis optical fiber 102.

Referring now to FIG. 2, the light that couples into the Y-axis optical fiber 102 is detected by a Y-axis photodetector 150. Similarly, light that couples into the X-axis optical fiber 104 is detected by an X-axis photodetector 152. The outputs of the photodetectors 150 and 152 are applied to an electronic error detector 154. The electronic error detector 154 process the information from the photodetectors 150 and 152 to produce X-axis correction signals on a line 156, Y-axis correction signals on a line 158, and Z-axis correction signals on a line 159. It should be noted that the electronic error detector 154 can include amplifiers, a microcontroller, memory circuits, comparators, A/D and D/A converters and the like.

The X-axis corrections signals are derived primarily from the outputs of the X-axis photodetector 152, while the Y-axis correction signals are derived primarily from the outputs of the Y-axis photodetector 150. However, the Z-axis correction signals are derived from the outputs of both the X-axis photodetector 152 and the Y-axis photodetector 150. With reference primarily to FIG. 2, the Z-axis correction signals relate to the focus of the light 142 on the light guide 110. If the light spot is too large, denoting poor focus, then the outputs of the X-axis photodetector 152 and of the Y-axis photodetector 150 are increased. Optimum focus is achieved when the sum of these signals are minimized.

Referring now to FIG. 3, the X-axis correction signals on the line 156 are applied to an X-axis relative motion-inducing device 160, while the Y-axis correction signals on the line 158 are applied to a Y-axis relative motion-inducing device 162. If the electronic error detector 154 determines that the light 142 is off-center in the X-direction, X-axis correction signals are produced that cause the X-axis relative motion-inducing device 160 to move the light spot produced by the light 142 toward the center of the core 112 along the X-axis. Likewise, if the electronic error detector 154 determines that the light spot is off-center in the Y-direction, Y-axis correction signals are produced that cause the Y-axis relative motion-inducing device 162 to move the light spot toward the center of the core 112 along the Y-axis. Referring now to FIG. 2, in addition, the Z-axis correction signals on the line 159 are applied to a Z-axis motion-inducing device 161. The Z-axis motion-inducing device 161 changes the focus of the light 142 on the light guide 110. Thus, the image projection system 10 includes a closed loop, error-controlled feedback network that automatically adjusts the position and focus of the light 142 such that the light 142 is efficiently coupled into the light guide 110.

It should be understood that the relative motion-inducing devices 160, 161, and 162 do not have to physically contact the light guide 110 or the light source 20. In fact, they can move a lens, a mirror, a prism or any other element that directs the light 142 into the light guide 110. FIG. 2 illustrates possible motions 170 of the reflector/lens 22 and possible motions 172 of the light source 20. Furthermore, the relative motion-inducing devices 160, 161, and 162 do not actually have to induce physical motion. For example, the relative motion-inducing devices can be opto-electronic positioning elements such as light valves or modulators. Thus, suitable relative motion-inducing devices 160, 161, and 162 include such things as motors, solenoids, electromagnetic elements, piezoelectric benders, light valves, diffraction gratings, and modulators.

The embodiments and examples set forth herein are presented to explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art. Therefore, it is intended that the scope of the present invention be defined by the claims appended hereto, giving full cognizance to equivalents in all respects.

The invention claimed is:

1. An optical system, comprising:
   a rectangular light guide having an inner core and an outer cladding layer;
   a first optical fiber that is optically coupled to a first side of the outer cladding layer and is configured to detect light that is propagating within the first side of the outer cladding layer;
   a second optical fiber that is optically coupled to a second side of the outer cladding layer and is configured to detect light that is propagating within the second side of the outer cladding layer;
   a first photodetector for sensing light coupled into the first optical fiber; and
   a second photodetector for sensing light coupled into the second optical fiber.

2. The optical system of claim 1, including an error detecting system coupled to the first photodetector and to the second photodetector, the error-detecting system for producing both X-axis error correction signals and Y-axis error correction signals based on light sensed by the first photodetector and by the second photodetector.

3. The optical system of claim 1, including an error detecting system coupled to the first photodetector and to the second photodetector, the error-detecting system for producing Z-axis error correction signals based on light sensed by the first photodetector and by the second photodetector.

4. The optical system of claim 2, including an X-axis relative motion-inducing device for moving a light beam relative to the inner core in response to the X-axis error correction signals.

5. The optical system of claim 4, including a Y-axis relative motion-inducing device for moving a light beam relative to the inner core in response to the Y-axis error correction signals.

6. The optical system of claim 3, including a Z-axis relative motion-inducing device for moving a light beam relative to the inner core in response to the Z-axis error correction signals.

7. The optical system of claim 1, including a light source for producing a light beam that is directed into the light guide.

8. The optical system of claim 1, wherein the first optical fiber includes a first core and a first cladding layer, wherein the first cladding layer is partially removed such that the first core optically contacts the outer cladding layer.

9. The optical system of claim 8, wherein the first core and the outer cladding layer have such similar refractive indexes that light in the outer cladding layer couples into the first core.

10. An image projection system, comprising:
    a rectangular light guide having an inner core and an outer cladding layer;
    a light source for projecting a light beam into the light guide;
    a first optical fiber optically coupled to a first side of the outer cladding layer that is configured to detect light that is propagating within the first side of the outer cladding layer;
    a second optical fiber optically coupled to a second side of the outer cladding layer that is configured to detect light that is propagating within the second side of the outer cladding layer;
    a first photodetector for sensing light coupled into the first optical fiber; and
    a second photodetector for sensing light coupled into the second optical fiber.

11. The image projection system of claim 10, including an error detecting system that is coupled to the first photodetector and to the second photodetector, the error detecting system for producing X-axis error correction signals, Y-axis error correction signals, and Z-axis error correction signals from the light sensed by the first photodetector and by the second photodetector.

12. The image projection system of claim 11, including an X-axis relative motion-inducing device for moving the light beam relative to the inner core in response to the X-axis error correction signals, a Y-axis relative motion-inducing device for moving the light beam relative to the inner core in response to the Y-axis error correction signals, and a Z-axis relative motion-inducing device for focusing the light beam in response to the Z-axis error correction signals.

13. The image projection system of claim 12, including a color separator that separates light from the light source into primary components.

14. The image projection system of claim 13, including a modulator system that modulates the primary components in accord with modulation signals.

15. The image projection system of claim 14, including an optical processor that combines the modulated primary components to produce image light beams.

16. The image projection system of claim 10, wherein the first optical fiber includes a first core and a first cladding layer, wherein the first cladding layer is partially removed such that the first core optically contacts the outer cladding layer of the rectangular light guide, and wherein the first core and the outer cladding layer have such similar refractive indexes that light in the outer cladding layer couples into the first core.

17. A method of coupling light into a rectangular light guide, comprising:

directing light into a light guide having a cladding layer;

removing a first portion of the light that is directed into and propagates within the cladding layer on a first side of the rectangular light guide, wherein the first portion is removed along an X-axis;

removing a second portion of the light that is directed into and propagates within the cladding layer on a second side of the rectangular light guide that is substantially orthogonal to the first side, wherein the second portion is removed along a Y-axis;

sensing the first portion of the light to determine an X-axis misalignment of the light; and sensing the second portion of the light to determine a Y-axis misalignment of the light.

18. The method of claim 17, including using the first portion and the second portion to determine a Z-axis misalignment of the light.

19. The method of claim 18, including adjusting the relative position of the light and the light guide such that the Y-axis, the X-axis, and the Z-axis misalignments are reduced.

20. The method of claim 19, wherein adjusting the relative position of the light and the light guide includes moving the light guide.

21. The method of claim 20, wherein the light guide is moved in both the X-direction and the Y-direction.

22. The method of claim 20, wherein adjusting the relative position of the light and the light guide includes moving the image of the light source.

23. The method of claim 17, wherein the sensed first and second portions of the light produce error-correcting signals that cause the X-axis, the Y-axis, and the Z-axis misalignments to be reduced.

* * * * *